May 26, 1970     J. GLORVIG     3,513,633

FILTER AND ELECTROSTATIC PRECIPITATOR IN REEL FORM

Filed Sept. 7, 1967     4 Sheets-Sheet 1

INVENTOR.
JAMES O. GLORVIG
BY Harry A. Herbert Jr.
Herbert H. Brown
ATTORNEYS

INVENTOR.
JAMES O. GLORVIG
BY Harry A. Herbert Jr
and Herbert H. Brown
ATTORNEYS

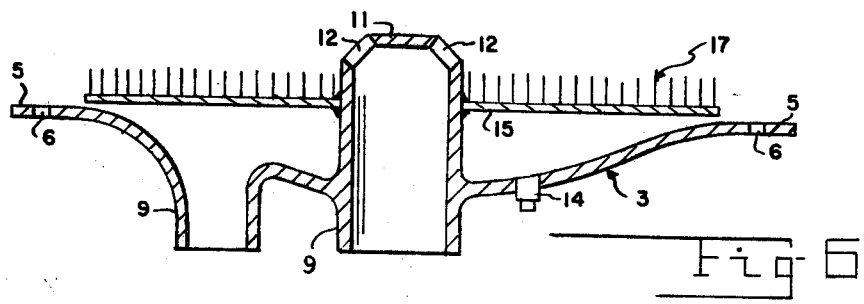
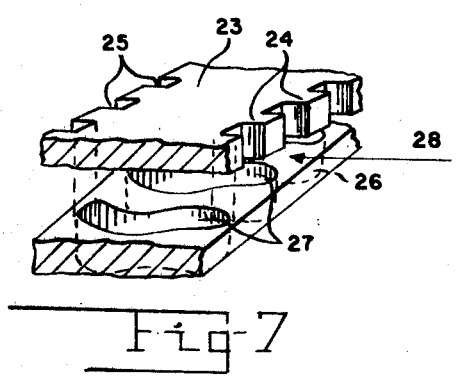
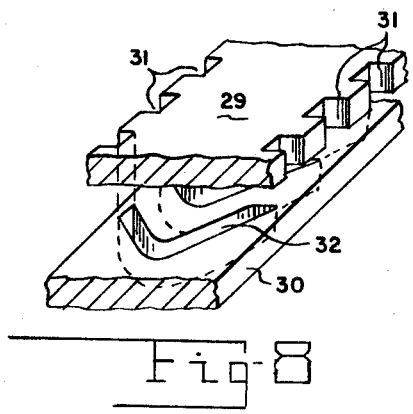
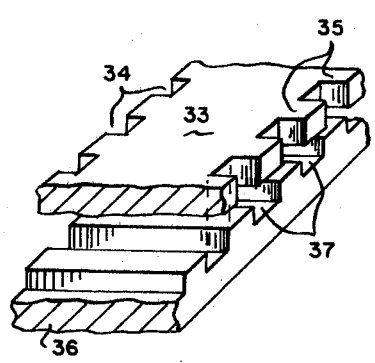
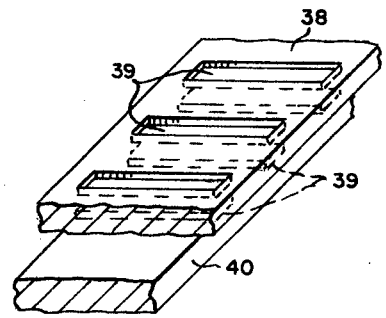

May 26, 1970  J. GLORVIG  3,513,633
FILTER AND ELECTROSTATIC PRECIPITATOR IN REEL FORM
Filed Sept. 7, 1967  4 Sheets-Sheet 4
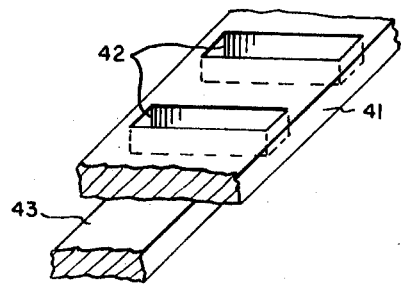
Fig-11
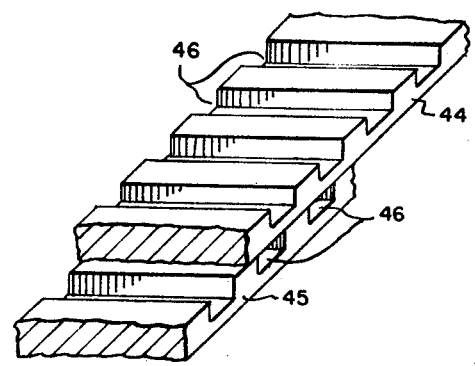
Fig-12
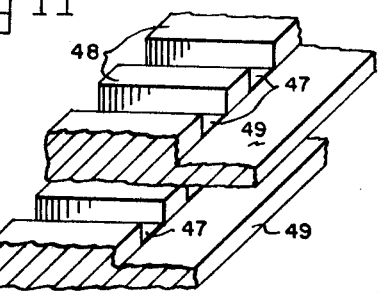
Fig-13
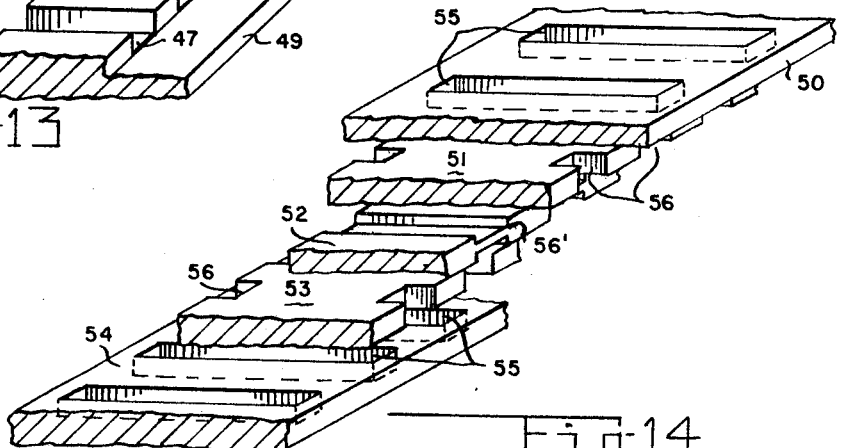
Fig-14
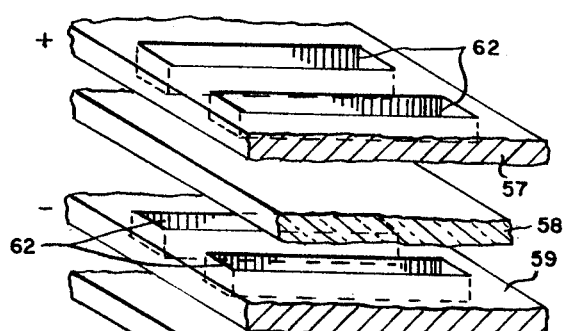
Fig-15
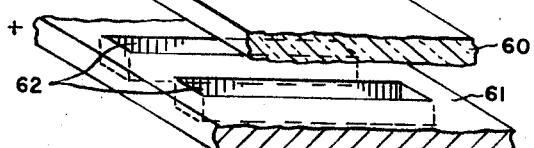
INVENTOR.
JAMES O. GLORVIG
BY Harry A. Herbert Jr.
Herbert H. Brown
ATTORNEYS United States Patent Office 3,513,633
Patented May 26, 1970

3,513,633
FILTER AND ELECTROSTATIC PRECIPITATOR IN REEL FORM
James O. Glorvig, 2707 Ticatica Drive,
Hacienda Heights, Calif. 91745
Filed Sept. 7, 1967, Ser. No. 666,568
Int. Cl. B03c 3/40
U.S. Cl. 55—131                1 Claim

ABSTRACT OF THE DISCLOSURE

A filter for separating particles from a fluid in which the filter elements are constituted over long, narrow strips or foils of metal or insulating material, wound reel fashion with the flat side down on a drum. The strips are wound in groups constituting a pair or other multiple number, some of the strips having slots along the edges and others having openings or grooves across the strips to provide minute passageways across the contracting surfaces for filtering fluids presented edgewise to the helical structure. One or more strips of the group being wound is made narrower than its adjacent contacting strip to leave projecting portions formed by the wider strips. These projections serve to snag the larger particles between them and leave the surface intermediate of the projections free from the snagged material. Particles, of less size than the largest size, are caught by the spaced edges of the strips of narrower width and only the smallest particles will be presented to the main body of the filter to pass through the minute passageways formed by the combination of slots and grooves in the strips. When the strips are alternately made of metal and charged to a positive polarity and the metal strips intermediate the polarized strips can be charged to a negative polarity. Consequently, an electrical filtering action is attained as well as a physical separation brought about by the minute passageways and the peak-to-peak impalement of the larger particles.

---

The invention described herein may be manufactured and used by and for the United States Government for governmental purposes without the payment to me of any royalty thereon.

BACKGROUND OF THE INVENTION

Filters now employed for separating particles from fluids such as hydraulic fluids, petroleum products in pipelines and distribution stations, also from gaseous fluids in the operation of rocket engines and their accessories take many forms depending upon their particular use, the nature of the fluid, the pressure involved, the average size and shape of the particles to be separated, and the rate of flow of the fluid to be treated.

DESCRIPTION OF THE PRIOR ART

In adapting commercial filters to their particular use, it has been the practice to build the filters as a honeycomb structure, of welded parts which cannot be disassembled, relying upon a reverse flow or blowback of a cleansing fluid to clear the passageways of the trapped particles. This is not altogether satisfactory since some of these pasageways do not respond to the reverse flow of treatment and considerable quantities of particles may still remain in the remote recesses.

Besides, when a particle of unusual size is presented to a conventional filter, the particle tends to spread itself over a large area of the filter entrances and thus clog up these entrances from the standpoint of filtering out particles of smaller or average size. Consequently, particles of the permissive character cannot pass through unless a prohibitive differential pressure is employed to maintain the proper filtration rate. The filter therefore acquires a relatively short life, from the standpoint of allowing fluid to pass at the full rate.

SUMMARY OF THE INVENTION

One object of the invention is to provide an inexpensive filter structure formed of thin metal strips or foils in which a series of strips of different width are wound simultaneously clockwise as a helix so as to leave the wider strips spaced by strips of less width. The strips are provided with transversely extending slots of various lengths so as to overlap one another and thus provide passageways between the convolutions for particles of limited size and shape. Since the strips or foils of narrower width are interleaved between the strips of wider width, the edges of the latter protrude beyond the narrower strips and serve to catch the large particles which straddle the projecting edges. These particles are thus restrained from reaching the edges of the narrower strips or foils. The filter as a whole is thereby kept clean of larger particles and accordingly has a longer life.

Another object is to provide a filter that can readily be taken apart for cleaning purposes and yet, when assembled, is sufficiently rugged to withstand high differential pressures.

Another object is to provide a filter which offers an extraordinary large filtering surface as compared with the amount of metal involved in the structure.

A further object is to provide a filter which can be made to fit any size conduit or compartment while maintaining the same filter construction within the various sizes. Thus, the filter can be made small or can be built to any large size desired without departing from the same fundamental type of construction.

Still another object is to provide a filter which will prevent the large particles from laying their full length against a number of entrances to the filter and thereby tending to clog the minute passageways.

The final object is to provide a filter of the type mentioned which can additionally be employed for setting up an electrostatic barrier to the passage of the particles.

DESCRIPTION OF THE DRAWING

FIG. 6 depicts a sectional view of a part of the filter structure illustrated in FIG. 1 and indicates the manner in which the filter strips or foils can be wound on a hub-like support;

FIG. 7 illustrates, in perspective, and greatly enlarged, the short fragmentary section of two layers constituted of a pair of apertured strips or foils wound convolutely to form the improved filter;

FIGS. 8 through 13 show modifications of the openings or grooves in the overlying convolutions of each pair of strips;

FIG. 14 represents a fragmentary modified filter section formed of five overlying foils of different widths which when wound in repeated turns of the same strips provide a "filtration-in-depth" effect;

FIG. 15 depicts a section of a modified strip-like filter in which some of the convolutions are electrostatically charged to provide an electrical separation of the particles from the passing fluid as well as the improved form of filtration.

DESCRIPTION OF THE PREFERRED EMBODIMENTS

Figure 1:
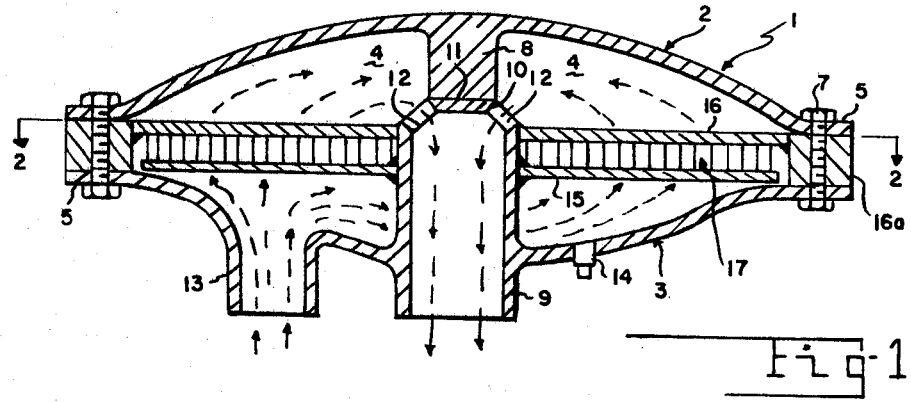
FIG. 1 represents a transverse section of the improved strip-like filter wound in reel form and contained within a fluid directing compartment.

Referring to FIG. 1, reference character 1 generally designates a partially spherical form of casing made up of two portions 2, 3 with concave surfaces facing one another to provide a chamber 4. The casing portions are circular in configuration and terminate in flat rims 5 having a plurality of equidistantly spaced holes 6 (FIG. 6) for receiving clamping bolts 7. The upper casing portion 2 is provided at the center with a downwardly depending member 8 of a depth as to contact the central portion of the lower casing portion 3 when they are clamped together by the bolts. The casing portion 3 has an upstanding centrally positioned hollow hub member 9, the lower end of which extends beyond the surface of the portion 3. The upper part of the hub member terminates in a chamfered portion 10 which is closed at the top by a flat section 11 of the same size as the member 8. A series of apertures 12, equidistantly spaced from one another, are provided in the portion 10. A circular hollow projection 13 extends downwardly from the portion 3 at a position about midway between the hub member 9 and the outer periphery of the rim portion 5. Each of the portions 2, 3 including the projection 8, the projection member 13 and the hub member 9 may be conveniently cast out of iron and are formed of substantial thickness. An opening may be left in the lower casing portion and is threaded to receive a drain plug 14.

There is a series of long bars of steel 15 equidistantly spaced about the hub 9 and extending outwardly almost as far as the rim portion 5. These bars are sufficiently thick as to be quite rigid and are welded to the hub at a portion about in line with the upper surface of the lower rim portion 5.

Figure 2:
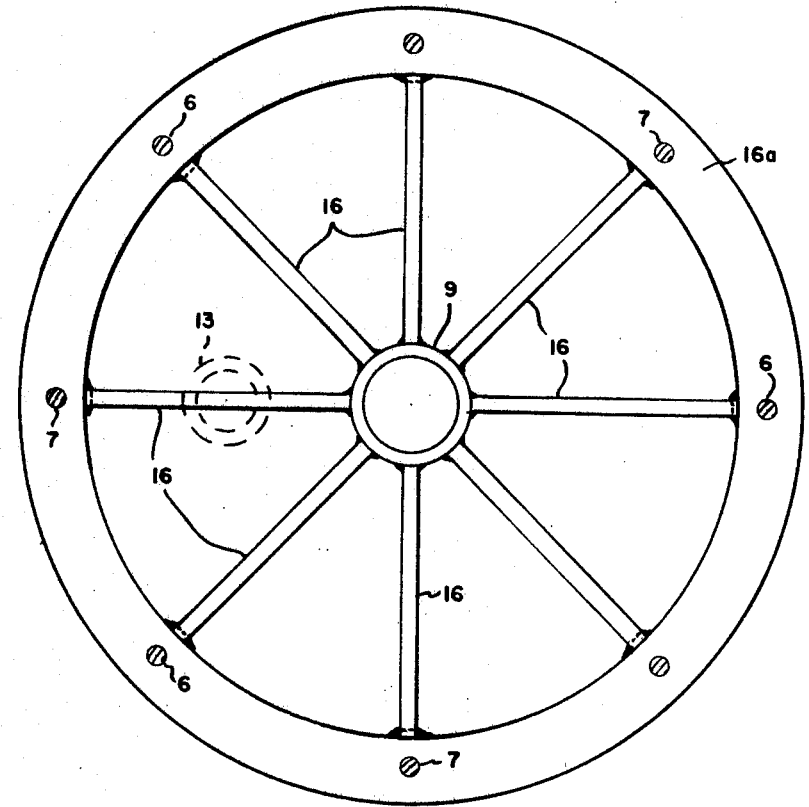
FIG. 2 is a plan view of the structure shown in FIG. 1 but with the top cover removed. This view is taken at about line 2—2 in FIG. 1.

Between the rim portions 5 there is a thick spacing ring 16a having holes coincident with the holes 6 for receiving the bolts 7. This ring carries a series of inwardly extending bars of steel 16, the inner ends of which may lightly contact the hub member 9. The bars 16 are preferably of the same number and are positioned above the bars 15 so that they are equidistantly spaced about the spacer member 16a to which they may be welded as shown in FIG. 2. The bars are also sufficiently thick as to be quite rigid. There is, therefore, a space left between the bars 15, 16 and this space is occupied by the improved reel-like filter, designated generally at 17, which will be described presently. It is apparent that the oppositely disposed bars serve to hold the filter reel in position.

One form of the improved filter element is comprised of two differently shaped thin strips of metal which may be termed foils or tapes, wound simultaneously in layer form as a convolute, the convolutions starting at the center which conveniently may comprise the outer surface of the hub member 9. For winding purposes the upper casing 2 and the spacing ring 16a, together with the bars or arms 16, are removed by withdrawing the bolts 7 leaving only the lower casing portion 3 and bars 15 as seen more clearly in FIG. 6. A plug (not shown) may be tightly fitted or otherwise secured to the bore of the hub and the plug inserted in the chuck of a low-speed lathe. Long tapes or metal foils having the configuration of those shown in FIG. 7, may be fed simultaneously to the rotating hub, one on top of the other, with one edge of both layers, that is, the left-hand edge as seen in the figure, held snugly against the bars 15 as the entire structure (FIG. 6) is slowly turned. The strip pairs are applied tightly as a reel so as to leave no space between abutting or contacting strips and for this purpose a drag feeding device of any suitable and well-known type may be employed. A sufficient number of double layers are wound as to bring the last layer out to the end of the bars 15 as is indicated in the figure. Both the inner and outer ends of the foil should be detachably secured to the bars 15 by a clamping device to assure that the convolutions remain tight during use. The spacing ring 16a together with the integral bars 16 are then fitted over the lower casing portion 3, with the bars positioned directly above the bars 15 and serving to line up the upper edges of the strips. In this position, the apertures in the spacing ring should exactly coincide with the openings in the lower rim 5. Finally, the upper casing portion 2 is brought into position so that the bolts 7 can be applied to clamp the three parts together bring the inner projection 8 into close contact with the upper flat portion of the hub 9.

While I have indicated that a reel-like filter can be conveniently wound on the hub 9, it is apparent that any other suitable and convenient way for winding the foils or strips together in a tight convolute form could be used. The wound filter could then be inserted on the hub, and secured in any suitable manner to the arms of the bars 15, 16. The completed filter and surrounding compartment are shown in FIG. 1. When fluid, air, water, etc., containing undesirable particles is pumped through the hollow projection 13, it would be forced to pass through the filter edgewise as indicated by the arrows into the upper part of the chamber 4 and thence through the openings 12 to the interior through the hub 9. The filtering action takes place within the minute passageways formed in the manner described hereinafter between the contiguous lengths of strip material which form each convolution of the wound pair or any other multiple group of strips or foils.

As these passageways become clogged with the separated particles which have failed to pass through the filter, the latter can be readily cleaned by simply reversing the steps involved when making the filter. Thus, the strips can be unwound and a stiff brush applied to both sides of the strips or foils which will immediately remove the clinging particles and then the strips can be rewound in the manner stated.

Figure 3:
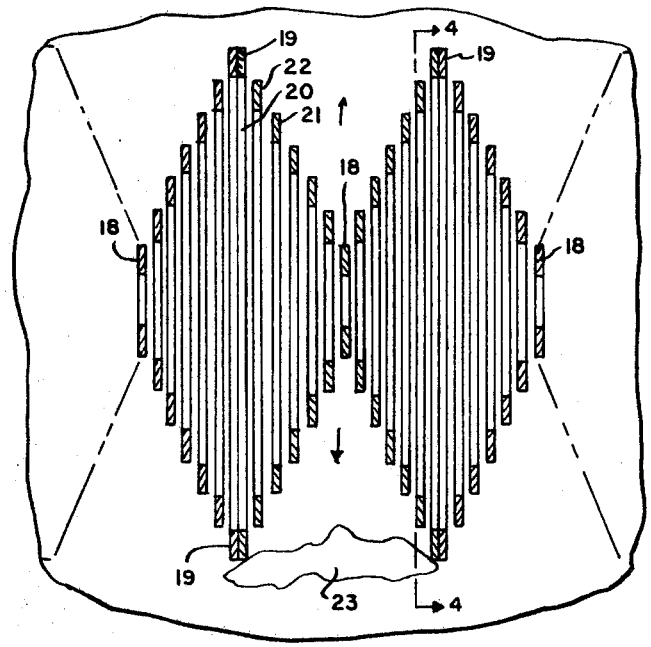
FIG. 3 represents a cross section of a thirteen-foil or strip group, each foil of which is slotted including the central member and the foils are symmetrically arranged with respect to one another according to width. The entrapment of a large particle is indicated in this figure.
Figure 4:
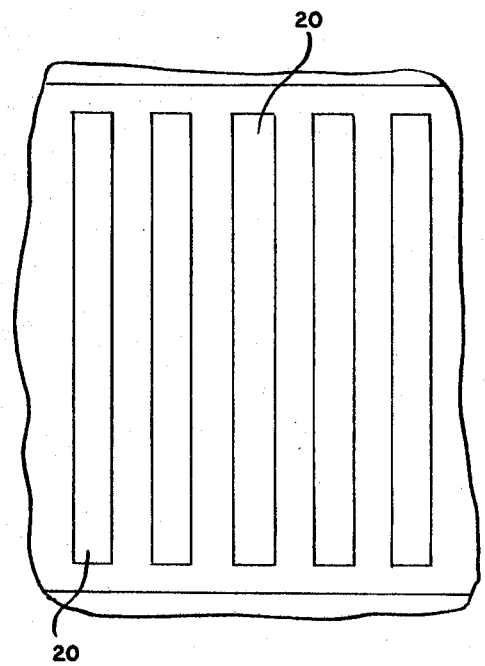
FIG. 4 is a view taken along the line 4—4 in FIG. 3 to show in general the position of the typical slots.
Figure 5:
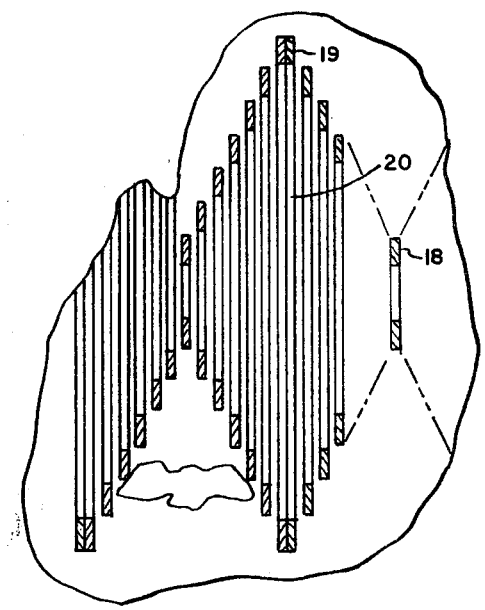
FIG. 5 represents a view identical with FIG. 3 except that it indicates how a smaller particle can reach closer to the main body of the filter and yet be prevented from entering the passageways of the filter.

One form of the improved filter element may be comprised of a thirteen-strip of foil group similar to those shown in FIGS. 3 and 5. The foil strips are of different widths, extending from the narrowest width, indicated at 18, and having progressively larger widths at each side of the element 18 until the strip 19 of the largest width is reached. Each strip has a number of parallel slots 20 (FIG. 4) extending transversely of the strip, equally spaced along the length of each tape or foil and leaving a margin between the end of each slot and the edge of the strip. The width of each strip is less than the length of the slot of the adjacent strip of longer length. Thus, in FIG. 4, the width of each strip (FIG. 3) is somewhat less than the length of the slot 20 of the next longer tape 19 and the same dimensional condition prevails throughout the remainder of the thirteen-strip group including the smallest width strip 18. In FIGS. 3 and 5, the strips are illustrated as being spaced from one another but it will be understood that these strips or foils actually contact one another over their wide surfaces. The small openings between the ends of the slots 20 and the outermost edges of the adjacent shorter strip serve as filtering passageways.

Due to the descending widths of the strips at the left side of each thirteen-foil group, the ascending widths at the right side, a series of concave and convex outlines at the upper and lower edges of the helical wound strips are produced as indicated in FIG. 3.

Assuming that the movement of the fluid is upward, a large particle such as element 23 will be caused to straddle the peaks formed by the largest width strips 19 and will not be permitted to enter the main body of the filter represented by the strips of smaller width. The last-mentioned portions of the filter are still free to receive the fluid and continue the filtering action. It is apparent that had the filter presented a flat surface to the foreign particle 23, the latter would have laid flat against the edge entrances over a considerable area, thus cutting off the filtering action over a large portion of the effective filtering area. As shown in FIG. 5, a particle of smaller size might be permitted to enter deeper into the filter body, but even here, the article would be caught between two oppositely disposed edges of the strips and still leave, at least some part of the edge surface free from actual contact with the particle so that these free surfaces will continue to function as a filter. This action might pertinently be called "filtering-in-depth" as distinguished from a condition in which the particle, regardless of its size, would lie flatwise over its entire area against the edge or edges of the filter.

FIG. 7 through FIG. 15 illustrate the apertures, grooves, slots, or other irregularities of the surfaces which may be provided in re-occurring convolutions of the strips or foils. Many of these modifications, as explained hereinafter, exhibit the so-called "filtration-in-depth" effect as will be pointed out hereinafter. These figures show the strips in considerable thickness for clearness, but it will be understood that the strips may be made of foil or tape thickness. Each group of the filtering elements may be wound on a hub 9 (FIG. 1) or any other form of support provided within a chamber which would require the fluid to be presented edgewise to the wound helical structure.

In FIG. 7, the upper strip or foil 23 is provided with square teeth or open slots 24 along each edge formed by the adjacent slots 25. In this case, the group consists of two strips to be wound in helical fashion. The companion strip 26 is narrower than the strip 23 and is provided with slots 27 which are of a wavy, continuously curved character. These slots pass through the thickness of the layer. The direction of the fluid is indicated by the arrow 28. It is obvious that in order to provide a passage for the fluid edgewise of each helical turn, even though quite restricted, it is necessary that the distance measured from the inner surface of each slot at one edge of the strip to the inner surface of each slot at the other edge of the strip shall be not less than the length of the underneath slot 27 as measured across this strip and that the position of each slot 27 shall be directly below its corresponding slot 25. In order to accommodate any stretching of the two strips or foils as they are being wound and to be certain that the slots 27 and 25 are in coincidence, it may be desirable to make the slots 25 somewhat wider than the alternate teeth 24. Thus the fluid will flow edgewise through the slot 25 and then through the slot 27 of the lower layer 26 and leave the filter at the slot of the upper layer or strip 23 at the opposite edge of the strip. It will be understood that while the upper and lower strips are shown in separated condition, solely for clearness, actually these layers are in close contact with one another due to the winding operation under tension referred to hereinbefore.

It is apparent that the positional relation between the slots of strip 23 and the wavy slots of strip 26 are such that small passageways are left at the contacting surfaces of the strips which serve to separate the particles of fluid so that the latter upon leaving the hub 9 (FIG. 1) will be free of extraneous material.

When the two-foil or strip unit is wound on a drum with the lower strip convolutions symmetrically positioned with respect to the upper strip convolutions, notwithstanding the fact that the lower srip is of narrower width than the upper strip, the teeth 24 of the re-occurring turns will project outwardly beyond the edge of the strip 26 to form spaced peaks separated by the thickness of the strip 26. Thus, a "filtering-in-depth" is obtained in that a large particle would be caused to be snagged between these peaks and prevented from laying flatwise against the entrance surface of the filter. Filters of this type are especially beneficial in aerospace uses in filtering out particles from cryogenics, hydraulic fluids, gasoline and other petroleum products in the 5 to 150 microns range for ground equipment, air and space vehicles, pipelines and distribution stations. They also are useful for filtering gases to maintain clean rooms and special applications with the compressed gases in the operation of rocket engines and instruments.

In FIG. 8, I have shown the upper foil or strip 29 of the wound pair as having teeth and slots 31 at each edge similar to FIG. 7. But the lower strip 30 is provided with two interconnecting slots 32 extending angularly to one another, similar to the shape of a "chevron." As in the case of FIG. 7, it is necessary that the crosswise length of the chevron slot shall be at least a little longer than the distance between the inner edges of the slots 31 measured in the transverse direction. The combination of the slots in the overlying layer and the chevron slots in the underneath layer provide minute passageways for the fluid to pass across the width of the strips but prevent the passage of entrained particles. The strip 30 is made narrower than the strip 29 so that when wound as a unit in helical form, the upper strip convolutions consititute outwardly extending projections which serve to snag the largest particles, thus preventing them from entering deeper into the filter and cause premature clogging.

FIG. 9 shows another form that the pair of foils or strips may take. In this case, the overlying strip 33 is provided with slots 34, interposed by the teeth 35 as in FIGS. 7 and 8. The underneath strip, however, has parallel grooves or slots 37 extending across the strip, the positions of the grooves correspond to the positions of the respective overlying slots. Passageways for the fluid, however minute, are assured through open parts of the joint between each convolute pair of strips. In this form of the invention, the strip 36 is of the same width as strip 33 so that when wound in convolute form, the edges conform with one another so that there is no "filtering-in-depth" effect. The filtering action is obtained solely by reason of the minute open space left between the slots 34 and the grooves 37.

Still another form that the wound, double-metal strip filter may take is found in FIG. 10. The overlying strip 38 is provided with slots 39 extending partly across the strip. The slots have a depth less than the thickness of the strip and may extend downwardly from the upper surface and upwardly from the lower surface of the strip, that is, in opposite directions. They are spaced equidistantly apart. The slots may be conveniently formed by an acid etching process which is well known in the art or can be machined, the lower or companion strip is narrower than the strip 38 and preferably is devoid of slots or grooves. However, the width of the strip 40 should be less than the length of the slots in order to provide passageways across the width between the strips of each convolution pair.

The strip 40, by reason of its narrower width, causes the edge of the upper strip 38 to project beyond the lower strip and when wound in convolute form provides peak edges. The larger particles are caused to be intercepted by these edges and thereby are prevented from entering the filter to any great extent as was explained in connection with FIGS. 3 and 5. Thus, most of the filtering area of the main part of the structure is kept free from these particles.

FIG. 11 shows the upper strip 41 as having equally spaced slots 42 extending partly across the width of the strip. These slots pass through the thickness of the strip. The lower strip 43 is narrow, similar to that described in connection with FIG. 10. It is apparent in winding the strip pair which employs the narrow strip 43, the position of the latter with respect to the overlaying strip should be gauged such that it is positioned centrally over the upper strip in order to leave passageways through the transversely extending slots.

In FIG. 12, the metal strips 44, 45 are shown of equal width and both are provided with transversely extending grooves or slots 46, cut only partially through the strips. It is not necessary in this case that the grooves of the strips 44, 45 coincide with one another, as clearly, the passageways are formed by each individual strip and not by the cooperation between a pair of strips or foils. It is further evident that, if desired, the strips 44, 45 could be wound separately from one another and not as a pair as would be necessary in the case of FIGS. 7 through 11.

FIG. 13 shows a modification of the structure illustrated in FIG. 12. The grooves 47 which form the lands 48, extend only one-half way through the foils or strips leaving the other half of the width of the strip, that is the front half as shown at 49 of only one-half the thickness of the strip. The strips are of the same width and, as in the case of FIG. 12 could, if desired, be wound separately rather than in pairs on the hub 9 (FIG. 1) or any other retaining structure.

FIG. 14 shows the application of my invention to a five-strip unit, which as in the case of FIG. 3 provides strips of descending width in order to obtain the "filtration-in-depth" effect in addition to an improved filtration by the use of deformations or other irregularities formed in the contacting strips. In this figure, the strips or foils are indicated at 50, 51, 52, 53 and 54. Strip 52 is the narrowest and strips 53 and 51 wider than strip 52 but narrower than strips 54 and 50. Strips 50 and 54 are provided with slots 55, equidistantly spaced and parallely arranged which pass through each strip. Strips 51 and 53 have slots 56 along both edges while the metal strip 52 is provided with a series of parallelly extending grooves 56' cut half-way through the thickness of each strip. These grooves may be etched by acid or formed in any other suitable manner. It is apparent that the strip 52 should be slightly less and in no case greater than the distance between the oppositely disposed slots 56 and the width of the strips 51, 53 should likewise be less than the length of the slots 55.

The five strips are wound as a unit on the hub 9 or on a similar structure, precaution being taken to centrally align the strips during the winding operation. The strips must be centrally disposed with respect to one another in order to provide passageways for the fluid presented edgewise to the reel.

A structure of this type provides an improved filtering action in view of the tortuous paths of different shapes and sizes offered to the fluid. More importantly, the structure provides in addition a "filter-in-depth" effect brought about by the fact that the edges of the strips 50, 54 obviously overhang the edges of the intermediate strips 51, 53 and the edges of the latter overhang the edge of the middle strip 52. Consequently, any large particle attempting to pass through the filter will straddle the projecting edges of strips 50, 54 and the next size particle would be caught at the front edges of the strips 51, 53. Therefore, only the smallest particle would actually reach the main body of the filter so that the latter would be effectively protected from being clogged by any of the larger particles. The operation of the structure shown in FIG. 14 insofar as the "filtering-in-depth" operation is concerned is somewhat similar to that as was described in detail in connection with FIGS. 3 and 5.

FIG. 15 shows the application of the invention to an electrostatic filter made up of five strips 57, 58, 59, 60 and 61, wound as a unit in a reel formation. The strips 57, 59 and 61 are constituted of relatively thin metal and all are the same width. The intervening strips 58 and 60 are narrower than the other strips and are made of imperforate insulating material or of metal coated with an insulating material which is readily bendable. Each of the strips 57, 59 and 61 are provided with transversely extending and parallel slots or perforations 62 of a length as to leave a narrow margin at the ends of the slots, assuming that the median lines of the strips coincide with one another, as shown. The slots pass through each strip and are equidistantly spaced along the length of the strip. The insulating strips 58 and 60 have a width a little less than the length of the slots 62 and are for the purpose of insulating the metal strips from one another. The five strips are tightly wound simultaneously into reel form either on the hub 9 (FIG. 1) or on any other suitable support. A high direct current voltage obtained, for example, from a rectified alternating current source is applied to the wide strips in any suitable and well-known manner as indicated by the polarity markings on the drawings. Thus, every other metal strip of each five-strip convolution is of opposite polarity. It is apparent that the electrically charged filter would be insulated in any manner from the metal of the compartment on which it is housed or otherwise supported. In view of the fact that the strips 58 and 60 are narrower width than the strips 57, 59 and 61, the latter constitute overhanging ledges when the strip group is wound in helical form. Thus, in addition to obtaining separation of the particles from the fluid presented edgewise to the filter by the electric charges, these overhanging edges serve to provide a "filtering-in-depth" effect which prevents the very large particles from entering the main body of the filter, and instead, serve to snag the particles at the outermost edges of the filter. In addition, the presence of the parallel slots 62 and their cooperation with the narrow width strips 58 furnish minute passageways through the filter that would effectively impede any passage to the fine particles carried by the fluid being presented edgewise to the filter. It is apparent that a filter of the type described in the various figures can be readily cleaned of any particles which lodge between the various strips by unwinding the latter and individually cleaning the sides of the strips as explained hereinbefore.

The various dimensions of the slots and grooves in the strips, also the width of the tapes or strips and the sizes of the passageways left when the convolutions are rolled to size, depend upon the amount, size and shape of the particle content of the fluid in addition to the rate of flow of the fluid and the degree to which the particles must be eliminated. The improved convoluted form of filter may, if desired, be made self-supporting, take on any diametral size as will accommodate the lightest as well as the smallest size of conduit through which the particulate fluid is flowing.

While certain specific embodiments have been described, it is obvious that numerous changes may be made without departing from the general principles and scope of the invention.

I claim:

1. A filter for separating particles from a particulate fluid, said filter being formed of a plurality of strips wound as a single group in convolute form, the median lines of the strip coinciding with one another, said strips being made of perforated metal with intervening strips of insulating material, each perforated metal strip having rectangular perforations extending across the width of the strip, said perforations being equidistantly spaced along the length of the strip, the width of each insulating strip being smaller than the length of the perforation in the immediately adjacent metal strip to leave the end portions of the perforations uncovered by the insulating strip whereby openings of constricted size are presented between the convolutions along each edge of the insulating strip and the strips of different widths leave overhanging edges which snag particles above a predetermined size when the fluid is presented edgewise to the wound filter, every other metal strip being charged to a positive potential, and the remaining metal strips being charged negatively, said metal strips being insulated from one another by said intervening insulating strips whereby the wound filter removes the particles from the presented fluid by electrical attraction and by the snagging effect of the larger particles by the overhanging edges formed by that portion the wider metal strips which extends beyond the narrower insulating strips.

References Cited

UNITED STATES PATENTS

| | | | |
|---|---|---|---|
| Re. 19,359 | 11/1934 | Armstrong | 210—494 |
| 1,729,135 | 9/1929 | Slauson | 55—520 X |
| 1,793,583 | 2/1931 | Bowden | 55—278 X |
| 1,976,547 | 10/1934 | Dumas | 210—169 |
| 2,095,470 | 10/1937 | Foley | 210—492 X |
| 2,115,577 | 4/1938 | Goldman | 210—494 |
| 2,129,697 | 9/1938 | Louisot | 210—494 X |
| 2,650,672 | 9/1953 | Barr et al. | 55—142 X |
| 2,850,169 | 9/1958 | Briggs | 55—278 X |
| 2,906,512 | 9/1959 | Meek | 261—24 |
| 3,025,964 | 3/1962 | Summers et al. | 210—487 X |
| 3,112,184 | 11/1963 | Hollenbach | 25—156 |

FOREIGN PATENTS

| | | |
|---|---|---|
| 515,023 | 7/1955 | Canada. |
| 600,967 | 7/1960 | Canada. |
| 611,710 | 1/1961 | Canada. |
| 393,022 | 10/1908 | France. |
| 352,038 | 7/1931 | Great Britain. |
| 583,045 | 12/1946 | Great Britain. |
| 671,096 | 2/1939 | Germany. |

DENNIS E. TALBERT, JR., Primary Examiner

U.S. Cl. X.R.

55—142, 146, 155, 278, 490, 520, 529; 210—494, 497.1